(12) United States Patent  
Kishigami et al.

(10) Patent No.: US 8,724,439 B2  
(45) Date of Patent: May 13, 2014

(54) OPTICAL RECORDING METHOD AND OPTICAL RECORDING DEVICE

(75) Inventors: Tomo Kishigami, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/260,150

(22) PCT Filed: Apr. 23, 2010

(86) PCT No.: PCT/JP2010/002950  
§ 371 (c)(1),  
(2), (4) Date: Sep. 23, 2011

(87) PCT Pub. No.: WO2010/134268  
PCT Pub. Date: Nov. 25, 2010

(65) Prior Publication Data  
US 2012/0033536 A1    Feb. 9, 2012

(30) Foreign Application Priority Data

May 18, 2009   (JP) ................................. 2009-119818

(51) Int. Cl.  
*G11B 7/00*        (2006.01)

(52) U.S. Cl.  
USPC .................... 369/53.26; 369/59.12; 369/47.5; 369/116

(58) Field of Classification Search  
USPC ............. 369/47.5, 47.51, 47.52, 47.53, 59.1, 369/59.11, 59.12, 53.26, 116  
See application file for complete search history.

(56) References Cited

U.S. PATENT DOCUMENTS 7,715,294 B2 *  5/2010  Tamaki et al. ............. 369/59.12
7,903,518 B2 *  3/2011  Kishigami et al. ......... 369/59.11
7,957,238 B2 *  6/2011  Kishigami et al. .......... 369/47.5
8,270,270 B2 *  9/2012  Liu et al. ..................... 369/47.5

(Continued)

FOREIGN PATENT DOCUMENTS

JP    2005-209243 A    8/2005
JP    2005-530301 A    10/2005

(Continued)

OTHER PUBLICATIONS

Lindsay I Smith, "A tutorial on Principal Components Analysis", Feb. 26, 2002.

*Primary Examiner* — Thomas Alunkal  
(74) *Attorney, Agent, or Firm* — Birch, Stewart, Kolasch & Birch, LLP.

(57) ABSTRACT

In an optical recording method, recording parameters (WU) to be used for recording are obtained using recommended recording parameter values (WR) read from an optical recording medium and previously obtained vector information (PC) and approximation coefficients (Ca, Cb) (S24). Writing to the optical recording medium is performed using the obtained recording parameters (S17). The vector information (PC) includes a vector component of the parameters obtained statistically with respect to parameter difference values (DF) between optimal recording parameter values (WO) and the recommended recording parameter values (WR) over a plurality of optical recording media so as to strengthen mutual correlation between the parameters. The approximation coefficients (Ca, Cb) are obtained by approximating a relationship between converted information (X) and feature information (D), the converted information (X) indicating a relationship between the vector information (PC) and the parameter difference values (DF), the feature information (D) indicating the features of each optical recording medium obtained from the recommended recording parameter values (WR) and the vector information (PC).

12 Claims, 9 Drawing Sheets

(56) References Cited

U.S. PATENT DOCUMENTS

| | | | |
|---|---|---|---|
| 2005/0099925 A1* | 5/2005 | Nakajo | 369/59.12 |
| 2005/0185537 A1* | 8/2005 | Ninomiya | 369/44.33 |
| 2005/0270941 A1* | 12/2005 | Nakajo | 369/53.12 |
| 2006/0023581 A1* | 2/2006 | Sunagawa et al. | 369/44.27 |
| 2006/0104178 A1* | 5/2006 | Nakajo | 369/59.11 |
| 2006/0140084 A1* | 6/2006 | Miyazawa et al. | 369/47.5 |
| 2007/0127341 A1 | 6/2007 | Sagara et al. | |
| 2007/0237051 A1* | 10/2007 | Kawai | 369/100 |
| 2008/0291802 A1* | 11/2008 | Chuang | 369/53.22 |
| 2009/0219794 A1* | 9/2009 | Onojima | 369/47.14 |

FOREIGN PATENT DOCUMENTS

| | | |
|---|---|---|
| JP | 2005-322312 A | 11/2005 |
| JP | 2006-4601 A | 1/2006 |
| JP | 2006-31915 A | 2/2006 |
| JP | 2006-48907 A | 2/2006 |
| JP | 2006-164486 A | 6/2006 |
| JP | 2007-18582 A | 1/2007 |
| JP | 3907630 B2 | 1/2007 |
| JP | 2007-172804 A | 7/2007 |
| JP | 2008-52783 A | 6/2008 |
| WO | WO 2004/001730 A1 | 12/2003 |

* cited by examiner

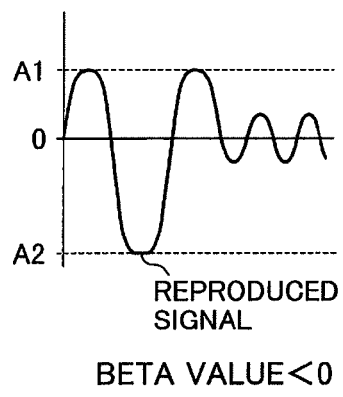
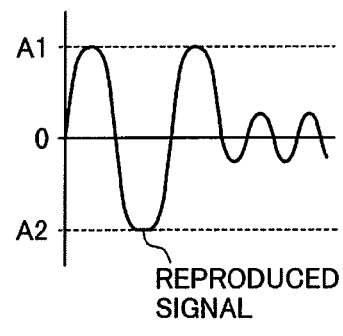
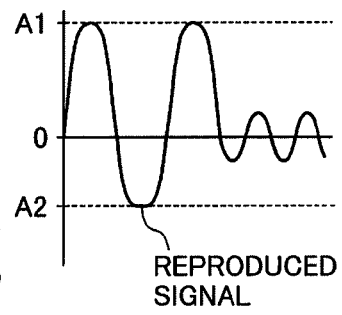
FIG.3(a) BETA VALUE<0
FIG.3(b) BETA VALUE=0
FIG.3(c) BETA VALUE>0
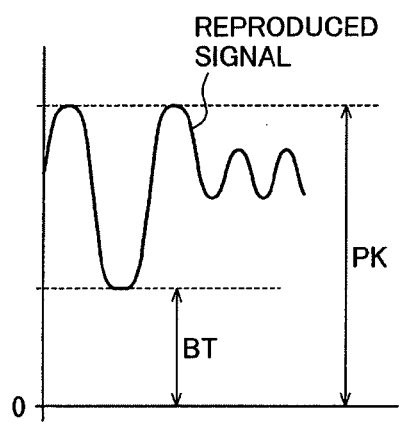
FIG.4

| ID | RECORDING PARAMETERS | | | | |
|---|---|---|---|---|---|
| | WS1 | WS2 | WS3 | ... | WSn |
| Maker 1 | OPTIMAL RECORDING PARAMETER VALUES CORRESPONDING TO ID = Maker 1 | | | | |
| Maker 2 | OPTIMAL RECORDING PARAMETER VALUES CORRESPONDING TO ID = Maker 2 | | | | |
| ⋮ | ⋮ | | | | |
| Maker k | OPTIMAL RECORDING PARAMETER VALUES CORRESPONDING TO ID = Maker k | | | | |

| FEATURE PARAMETERS D | | | | | RECORDING PARAMETER OFFSETS | | | | |
|---|---|---|---|---|---|---|---|---|---|
| Di1 | Di2 | Di3 | ... | Din | WPi1 | WPi2 | WPi3 | ... | WPin |
| FEATURE PARAMETER D1 | | | | | RECORDING PARAMETER OFFSET OF1 | | | | |
| FEATURE PARAMETER D2 | | | | | RECORDING PARAMETER OFFSET OF2 | | | | |
| ⋮ | | | | | ⋮ | | | | |
| FEATURE PARAMETER D3 | | | | | RECORDING PARAMETER OFFSET OFi | | | | |
| ⋮ | | | | | ⋮ | | | | |
| FEATURE PARAMETER Dk | | | | | RECORDING PARAMETER OFFSET OFk | | | | |

OPTICAL RECORDING METHOD AND OPTICAL RECORDING DEVICE

FIELD OF THE INVENTION

1. Field of the Invention

The present invention relates to an optical recording method and an optical recording device for recording information on an optical disc, and more particularly to a method of determining recording parameters such as the write strategy used in recording (the light emission control settings of the laser used in recording) and the OPC (Optimum Power Control) settings used in optimal recording power control.

2. Background Art

To record information on an optical disc, the write strategy and the settings used for OPC (optical recording power control), as recording parameters used in recording, must be optimally adjusted to the characteristics of the optical disc. Recommended values of the recording parameters as defined by the manufacturer are usually recorded on the optical disc, but the specifications of the optical pickup of the optical recording device used to determine the recommended values differ, in many cases, from the specifications of the optical pickups used in general optical recording devices, so that in many cases, recording cannot be performed properly even when the recommended recording parameters are used. Therefore, recording parameters (write strategy and OPC settings) optimal for each optical disc ID (identification information) are generally stored in the optical recording device and used in recording.

If the optimal recording parameters for an optical disc are stored in this way in the optical recording device, however, it is necessary to obtain the optimal recording parameters for each optical disc in advance; a problem is that it is not possible to store the optimal recording parameters for optical discs that are newly released after shipment of the optical recording device.

As one remedy, an area of pits (marks) formed by test writing can be read, the deviation of the signal read from the area of pits can be evaluated, and the write strategy correction can be repeatedly adjusted to bring the deviation within a prescribed range (see patent documents 1-5). In another remedy, the recommended write strategy values recorded on the optical disc are read, and the width of the leading pulse to be used in recording is calculated from the recommended value of the leading pulse width of the write strategy (e.g., patent document 6).

PRIOR ART REFERENCES

Patent Documents

Patent document 1: Japanese Patent Application Publication No. 2006-004601 (pp. 1-14, FIGS. 1-16)
Patent document 2: Japanese Patent Application Publication No. 2006-031915 (pp. 1-13, FIGS. 1-10)
Patent document 3: Japanese Patent Application Publication No. 2006-048907 (pp. 1-16, FIGS. 1-19)
Patent document 4: Japanese Patent Application Publication No. 2006-164486 (pp. 1-13, FIGS. 1-17)
Patent document 5: Japanese Patent Application Publication No. 2007-018582 (pp. 1-11, FIGS. 1-11)
Patent document 6: Japanese Patent No. 3907630 (pp. 1-15, FIGS. 1-11)

SUMMARY OF THE INVENTION

Problems to be Solved by the Invention

When the write strategy correction is repeated for adjustment in the conventional optical recording devices above, time is needed before recording begins, and much of the limited amount of test writing space on the optical disc is used up. In addition, in the light emission rules in some write strategy there are so many write strategy parameters to be adjusted that the optimal adjustment cannot be achieved just by varying the parameters one by one.

Another problem is that when the write strategy is obtained by calculation, the width of the leading pulse used in recording is obtained by calculation from the recommended width of the leading pulse of the write strategy recorded on the optical disc, but this can only be done for certain light emission rules and cannot be done for other light emission rules.

This invention addresses the above problems with the object of obtaining an optical recording method and an optical recording device that can obtain recording parameters that enable proper recording without taking a long time before the start of recording, even for an optical disc for which appropriate recording parameters are not known in advance.

Another object of the invention is to provide an optical recording method and an optical recording device which make it possible to obtain recording parameters for appropriate recording regardless of the write strategy light emission rule or recording speeds.

Means for Solving the Problems

The optical recording method according to the invention is an optical recording method for recording information on an optical recording medium by directing laser light onto the optical recording medium according to recording parameters responsive to recorded data length, the recording parameters including a plurality of parameters, the optical recording method comprising:

a recommended recording condition reading step for reading recommended recording parameter values from the optical recording medium, on which the recommended recording parameter values have been recorded;

a recording parameter decision step for using the recommended recording parameter values read in the recommended recording condition reading step and vector information and approximation coefficients obtained in advance to obtain the recording parameters to be used in recording; and a writing step for using the recording parameters thus obtained to write on the optical recording medium by the recording method; wherein the vector information includes a vector component of the parameters obtained statistically with respect to parameter difference values between optimal recording parameter values and the recommended recording parameter values over a plurality of optical recording media so as to strengthen mutual correlation between the parameters; and the approximation coefficients are approximation coefficients obtained by approximating a relation between converted information indicating a relation between the vector information and the parameter difference values, and feature information indicating features of each optical recording medium obtained from the recommended recording parameter values and the vector information.

Effect of the Invention

According to the present invention, even when the optimal recording parameters for an optical disc are unknown, the optimal recording parameters can be obtained quickly.

BRIEF DESCRIPTION OF THE DRAWINGS

FIGS. 3(a) to 3(c) show examples of the asymmetry of reproduced signals measured by the reproduction characteristic measurement unit 150 in FIG. 2.

FIG. 4 shows an example of the modulation index of a reproduced signal measured by the reproduction characteristic measurement unit 150 in FIG. 2.

MODE FOR CARRYING OUT THE INVENTION

Figure 1:
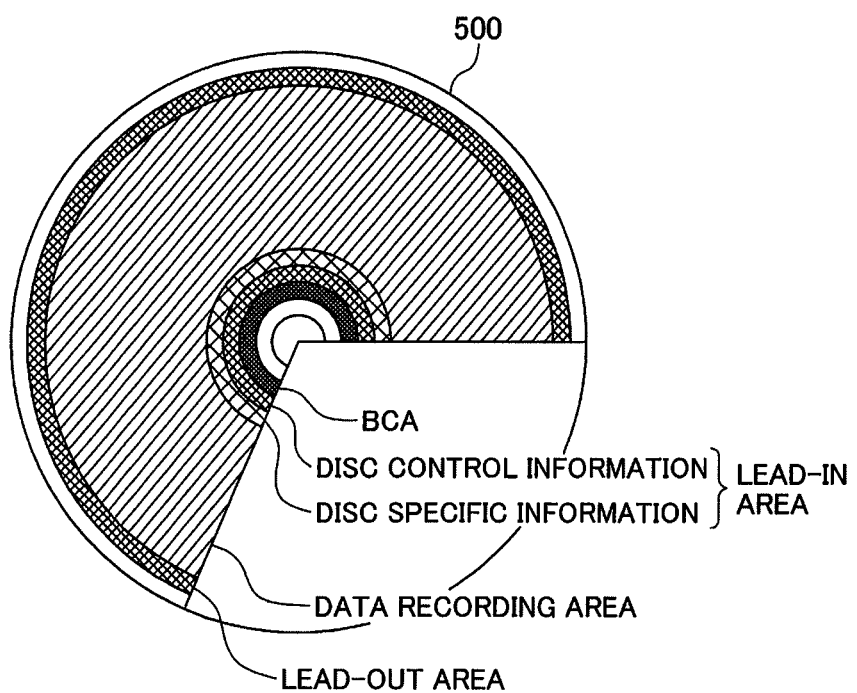
FIG. 1 shows an example of the configuration of an optical disc used in optical recording methods and devices according to embodiments of this invention.

The optical recording methods and optical recording devices in this invention record on optical discs on which recommended recording parameter values have already been recorded. The recommended recording parameter values are recorded by the optical disc manufacturer in a specific area, such as the lead-in area in FIG. 1 as recording parameters suitable for use in recording. The conditions according to which the recommended recording parameter values are determined, for example the specifications of the optical pickup of the optical recording device (e.g., its laser wavelength, the numerical aperture NA of its objective lens, etc.) are determined by the kind of optical disc. The kinds of optical discs include the Blu-ray Disc (BD), DVD, CD, and so on, and each of these kinds is classified as write-once or rewritable.

Included among the recommended recording parameter values recorded on the optical disc are recommended write strategy values (settings of the pulse width and edge positions, and recording parameter settings for determining the laser light emission pattern, including the ratio of recording power to erasing power) and recommended values for optimizing the recording power by OPC (for example, the asymmetry value or the like).

Different recommended recording parameter values are recorded on the optical disc for different recording speeds and write strategy light emission rules (for example, multi-pulse, non-multi-pulse light emission rules, etc.).

The recommended recording parameter values assume that recording will be carried out under certain conditions. For other recording conditions, accordingly, recording should be carried out with recording parameters that differ from the recommended recording parameter values. The present invention determines the recording parameters to be used in recording from the recommended recording parameter values, by using coefficients based on the relation between the recommended recording parameter values read from the optical disc and optimal recording parameters found with the optical pickup of the optical recording device used in recording, and carries out recording using the determined recording parameters.

First Embodiment

The optical recording method in the embodiments described below performs mark edge recording (PWM recording). Information is recorded by forming recording marks by causing a semiconductor laser to emit light according to a write strategy (a laser light emission waveform rule used in recording) responsive to data to be recorded on an optical disc.

Figure 2:
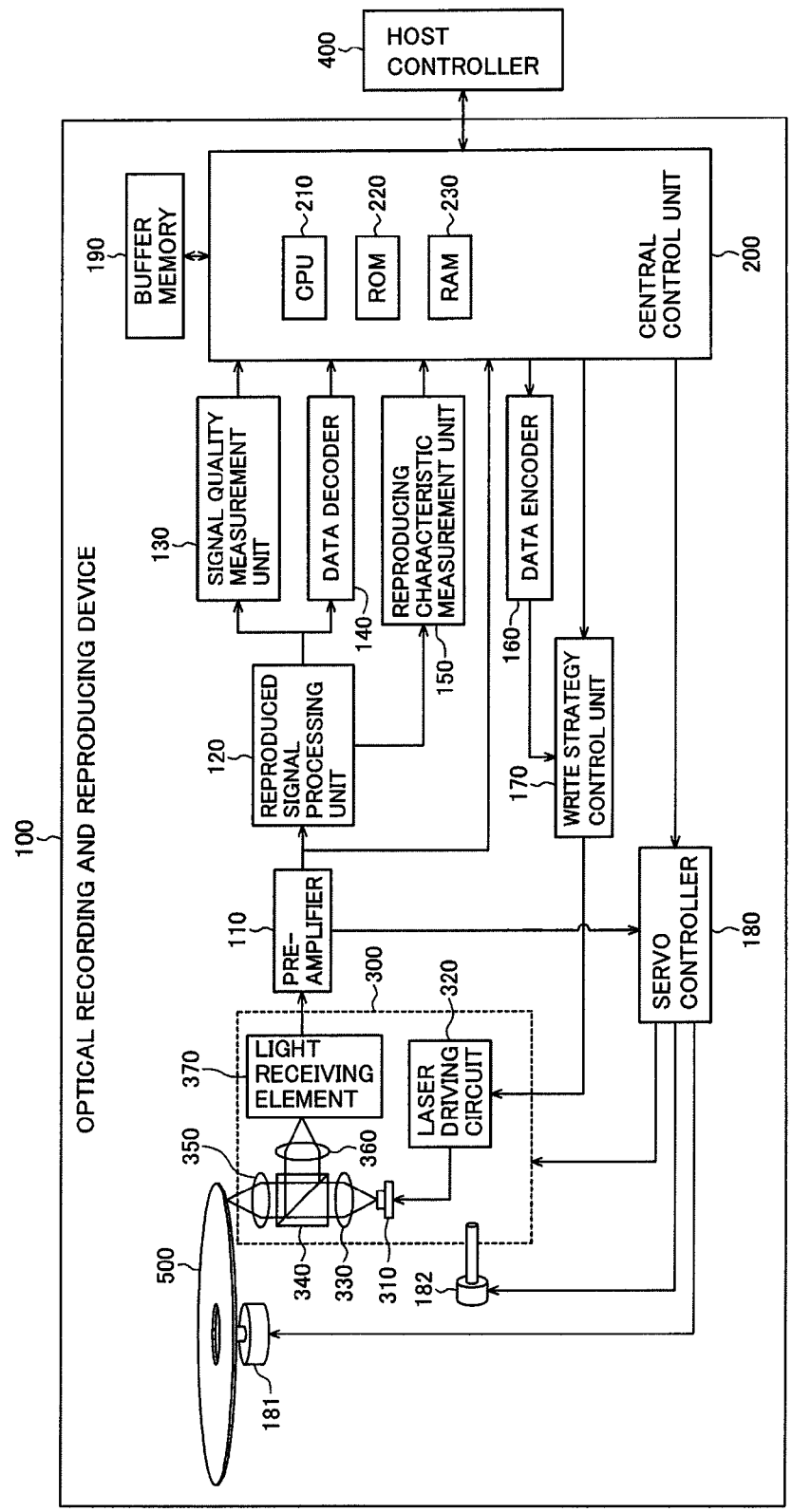
FIG. 2 is a block diagram illustrating an optical disc device according to the embodiments of this invention.

FIG. 2 is a diagram showing an exemplary basic configuration of an optical recording device 100 according to a first embodiment of the invention. The case in which the optical recording device 100 records EFM+ (8-16) modulated data on an optical disc 500 (e.g., the case in which the optical disc 500 is a DVD) is shown.

The servo controller 180 controls the spindle motor 181 that spins the optical disc 500, the sled motor 182 that moves the position of the optical head 300, and the actuator (not shown) of the optical head 300.

The reproduced signal from the optical head 300 is amplified in the preamplifying circuit 110 and input to the central control unit 200. The central control unit 200 decodes address information in the input signal and obtains (address information indicting) the present position of the optical head 300.

When the difference between the address information indicating the present position and address information indicating a position to be accessed (access target position) is given, the servo controller 180 controls the sled motor 182 to move the optical head 300 to the target position. In addition, the servo controller 180 performs focus control and tracking control based on servo error signals from the preamplifier 110.

In reproducing data, laser light with an output value (reproduction power) required for data reproduction is emitted from a semiconductor laser 310 driven by a laser driving unit 320 and focused on the optical disc 500 through a collimating lens 330, a beam splitter 340, and an objective lens 350. The reflected light from the optical disc 500 passes through the objective lens 350, is separated from the incident light by the beam splitter 340, and is received by a light receiving element 370 via a detecting lens 360.

Among the elements described above, the semiconductor laser 310, collimating lens 330, beam splitter 340, objective lens 350, and detecting lens 360 constitute an optical system, and the optical system, the light receiving element 370, the laser driving unit 320, and the actuator (not shown) constitute the optical pickup 300.

The light receiving element 370 converts an optical signal to an electrical signal. The electrical signal as converted in the light receiving element 370 is input to a central control unit 200 and a reproduced signal processing unit 120 via the preamplifier 110.

The reproduced signal processing unit 120 equalizes (re-shapes) the electrical signal from the preamplifier 110 and inputs the resultant signal to a signal quality measurement unit 130 and data decoder 140. The reproduced signal processor 120 also inputs the unequalized signal to a reproducing characteristic measurement unit 150.

The reproducing characteristic measurement unit 150 obtains a reproducing characteristic, such as an asymmetry value or modulation index value, for use in the adjustment of recording power required in recording. The recording quality measurement unit 130 measures signal quality, such as the jitter value or error rate of the reproduced signal.

The data decoder 140 binarizes the input reproduced signal and performs demodulation, error correction, and other processing to generate (reproduce) the data recorded on the optical disc 500. The optical recording device 100 is connected to a host controller 400; the central control unit 200 stores the generated data in a buffer memory 190, and then sends the data to the host controller 400.

When obtaining the asymmetry value, the reproducing characteristic measurement unit 150 couples the input electrical signal (the signal output from the preamplifier 110) by AC (alternating current) coupling, and calculates an asymmetry value β based on the AC-coupled electrical signal. Exemplary AC-coupled electrical signals as described above are shown in FIGS. 3(a) to 3(c). The reproducing characteristic measurement unit 150 detects the peak level A1 and the bottom level A2 of the signals exemplified in FIGS. 3(a) to 3(c). The asymmetry value β is calculated from the detected peak level A1 and bottom level A2 by use of the following expression (1).

$$\beta = (A1 + A2)/(A1 - A2) \quad (1)$$

In this case, the peak level A1 and bottom level A2 occur where the longest space and the longest mark appear alternately, and their values are represented in relation to a zero level equal to the mean value of the peak level and bottom level occurring where the shortest space and the shortest mark appear alternately.

As mentioned above, FIGS. 3(a) to 3(c) show exemplary detected asymmetries of the reproduced signal (the signal output from the preamplifier 110) detected in the reproducing characteristic measurement unit 150: FIG. 3(a) shows a case in which the beta value (β) is less than zero; FIG. 3(b) shows a case in which the beta value β) equals zero; FIG. 3(c) shows a case in which the beta value β) is greater than zero.

When obtaining the modulation index value, the reproducing characteristic measurement unit 150 detects the peak level PK and bottom level BT of the input electrical signal. In this case, differing from the asymmetry value determination, the peak level PK and bottom level BT of the (DC-coupled) signal are detected without AC coupling, and the modulation index is calculated by use of the following expression (2).

$$\text{Modulation index} = (PK - BT)/PK \quad (2)$$

FIG. 4 shows an exemplary signal obtained in this way by DC coupling. As shown, the peak level PK and bottom level BT are referenced to the zero level (the output offset value when the light receiving element 370 has no input (no incident light reflected from the optical disc)). The peak PK and bottom BT respectively correspond to the levels of the longest space and longest mark.

In recording data, the central control unit 200 stores data from the host controller 400 in the buffer memory 190; then a data encoder 160 adds an error correction code, modulates the data according to a modulation rule, and generates data to be recorded according to the format of the optical disc 500.

The write strategy control unit 170 generates a write strategy signal according to the data to be recorded. That is, after the write strategy has been set by the central control unit 200, when data to be recorded specifying n periods, indicating a mark length are given from the data encoder 160, the write strategy control unit 170 outputs a write strategy signal (a signal generated according to the write strategy, having substantially the same waveform as the waveform of the emitted light pulse train) corresponding to the data to be recorded.

The laser driving unit 320 drives the semiconductor laser 310 with driving current corresponding to the generated write strategy signal. A laser beam with an output value (recording power) required for data recording is emitted from the semiconductor laser 310 and focused onto the optical disc 500 by the collimator lens 330, the beam splitter 340, and the objective lens 350. A mark is thereby formed, and a recorded portion is formed consisting of marks and spaces positioned between the marks.

Figure 5:
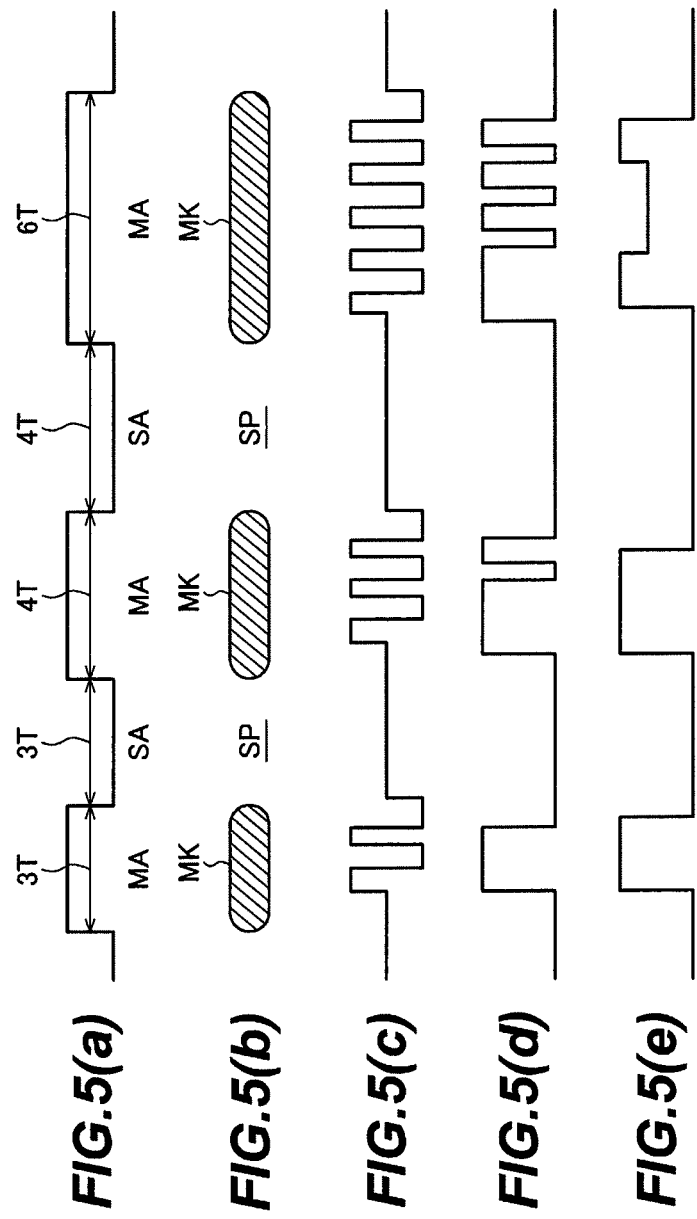
FIGS. 5(a) to 5(e) show an example of a write strategy generated in the optical recording device in the embodiments of this invention when EFM+ (8-16) modulation is used to record on an optical disc (DVD).

FIGS. 5(a) to 5(e) show exemplary write strategy signals generated by the write strategy control unit 170 in the optical recording device 100 shown in FIG. 2. FIG. 5(a) shows exemplary data to be recorded, consisting of mark portions MA and space portions SA; FIG. 5(b) shows the marks MK and the spaces SP positioned between the marks that are formed when the data in FIG. 5(a) are recorded on the optical disc 500. The EFM+ (8-16) modulated recorded data can have lengths corresponding to from n=3 periods or 3 T for recording a minimum-length mark to n=11 periods or 11 T, or a length corresponding to n=14 periods or 14 T for recording a maximum-length mark.

FIGS. 5(a) to 5(e) assume the case in which a minimum-length mark or 3 T mark is recorded, then a next shortest mark or 4 T mark is recorded, and then a fourth shortest mark or 6 T mark is recorded.

FIG. 5(c) shows an exemplary write strategy signal generated in the write strategy control unit 170 when the data are recorded on an optical disc 500 that is a rewritable recording medium (e.g., a DVD-RW). FIGS. 5(d) and 5(e) show exemplary write strategy signals generated in the write strategy control unit 170 when the data are recorded on an optical disc 500 that is a write-once recording medium (e.g., a DVD-R). The write strategy signal in FIG. 5(d) is used for low speed recording (1× to 4× speeds, for example); the write strategy signal in FIG. 5(e) is used for high speed recording (4× or higher speeds, for example).

In order to generate write strategy signals like those in FIGS. 5(c) to 5(e) in the write strategy control unit 170, the central control unit 200 must set a plurality of write strategy parameters; the number of types of parameters increases as the shape of the write strategy signal becomes more complex.

The central control unit 200 controls the optical recording device 100 as a whole in reproducing and writing data; it receives jitter and other recording quality indexes from the recording quality measurement unit 130, asymmetry values or modulation index values from the reproducing characteristic measurement unit 150, and reproduced data from the data decoder 140, and gives control signals to the data encoder 160, write strategy control unit 170, laser driving unit 320, and servo control unit 180.

The central control unit 200 also determines the recording parameters as will be described later with reference to FIGS. 6 to 9; in particular, it calculates the settings of the recording parameters, controls test writing carried out using the calculated recording parameters, and so on.

The central control unit 200 includes, for example, a CPU 210, a nonvolatile memory such as, for example, a ROM 220 that stores a program for operating the CPU 210, and a data memory such as a RAM 230 for storing data. The program stored in the ROM 220 includes a section that calculates the recording parameters, and sections that define settings and so on necessary for the calculations, and for recording power adjustment, as described later with reference to FIG. 6. The ROM 220 is also used, as described later, to store predetermined coefficients, and is preferably of the rewritable type.

In general, recording power is optimized by test writing before information is recorded. This procedure will be described below.

First, test writing is performed on the optical disc 500 by recording, for example, a random data pattern while varying the recording power; next the region of the optical disc 500 in which the test pattern is recorded is reproduced; then the asymmetry value is detected by the reproducing characteristic measurement unit 150, and the detected asymmetry value is compared with a target asymmetry value to obtain the optimal recording power.

In general, as the recording power is increased, the asymmetry value increases; as the recording power is decreased, the asymmetry value decreases. Asymmetry values are often used to optimize the recording power in write-once optical recording media (DVD-R, BD-R, etc.); modulation index values are often used in rewritable discs (DVD-RW, BD-RE, etc.). Modulation index values, in general, also increase as the recording power is increased, and decrease as the recording power is reduced.

In the central control unit 200, the detected asymmetry values corresponding to a plurality of different recording powers are compared with the target value, and the recording power that generated the detected value nearest to the target value is set as the optimal recording power.

Alternatively, the optimal value may also be obtained by performing test writing onto the optical disc 500 with a single recording power, then performing reproduction, detecting the asymmetry value from the reproduced result, comparing the detected asymmetry value with the target asymmetry value, and increasing or reducing the recording power depending on the comparison result.

For a rewritable disc, instead of using the modulation index of the optimal recording power as a target value, sometimes the optimal recording power is calculated by using a modulation index in a recording power region in which the modulation index varies greatly with respect to the recording power (a recording power region lower than the optimal recording power) as the target value, and multiplying the obtained recording power by a preset coefficient.

A procedure for the optical recording method in this embodiment will now be described with reference to FIG. 6.

First, when the optical disc 500 is inserted in the optical recording device 100, a sensor (not shown) detects the insertion (step S10) and notifies the central control unit 200 of the insertion, and the central control unit 200 drives the optical head 300 via the servo control unit 180 and determines the kind of optical disc 500 inserted in the optical recording device 100 (CD, DVD, BD, or other type) and the number of layers and other information about the optical disc 500 (step S11).

Next, after adjustment of the servo conditions, the tilt angle with respect to the optical disc 500, and the like in step S12, the recommended recording parameter values prerecorded by the disc manufacturer are read from the optical disc 500 in step S13. Information about the light emission rule and recording speed corresponding to the recommended recording parameter values thus read is also read simultaneously in step S13. If recommended recording parameter values for a plurality of light emission rules and recording speeds are recorded on the optical disc 500, the light emission rule and recording speed that will actually be used in recording on the optical disc 500 are selected and the recommended recording parameter values correspondig to the selected light emission rule and recording speed are read from the optical disc 500. The recommended recording parameter values WR that have been read are held in, for example, the RAM 230 in the central control unit 200.

Next, in step S14, the recording parameters that will be used in recording are calculated and set, using the recommended recording parameter values that have been read and coefficients for calculating the recording parameters, which are stored in the central control unit 200 (in the ROM 220, for example). A detailed description will be given later with reference to FIG. 7.

Then, when a record command is given by a means not shown in the drawings (step S15), in step S16, the recording parameters set in step S14 are used to perform test writing on the optical disc 500. That is, the recording parameters that were set in the central control unit 200 in step S13 are set in the write strategy control unit 170, whereby the write strategy control unit 170 generates a write strategy based on a test pattern and performs test writing onto the optical disc 500 by using the optical head 300. The area on the optical disc 500 on which the test pattern has been recorded is reproduced by the optical head 300, and the central control unit 200 compares the reproducing characteristic (asymmetry value or modulation index) detected by the reproducing characteristic measurement unit 150 with the OPC setting (asymmetry value or modulation index) set in step S14 and performs control to make the two match, whereby the optimal recording power is determined.

Finally, in step S17, the writing of intended data (the intended writing) onto the optical disc 500 is started, using the write strategy with the recording parameters set in step S14 and the recording power determined in step S16.

Of the above processes, the process in step S10 is performed by the central control unit 200 and a sensor (not shown) for detecting the insertion of an optical disc, the processes in steps S11 and S12 are performed by the optical head 300, preamplifier 110, servo control unit 180, and central control unit 200, the process in step S13 is performed by the optical head 300, servo control unit 180, preamplifier 110, reproduced signal processor 120, data decoder 140, and central control unit 200, the process in step S14 is performed by the central control unit 200, the process in step S15 is performed by the central control unit 200 and a means (interface) for receiving the record command, the process in step S16 is performed by the servo control unit 180, preamplifier 110, reproduced signal processor 120, reproducing characteristic measurement unit 150, central control unit 200, write strategy control unit 170, and optical head 300, and the data recording process in step S17 and the following steps is performed by the central control unit 200, data encoder 160, write strategy control unit 170, servo control unit 180, and optical head 300.

Figure 6:
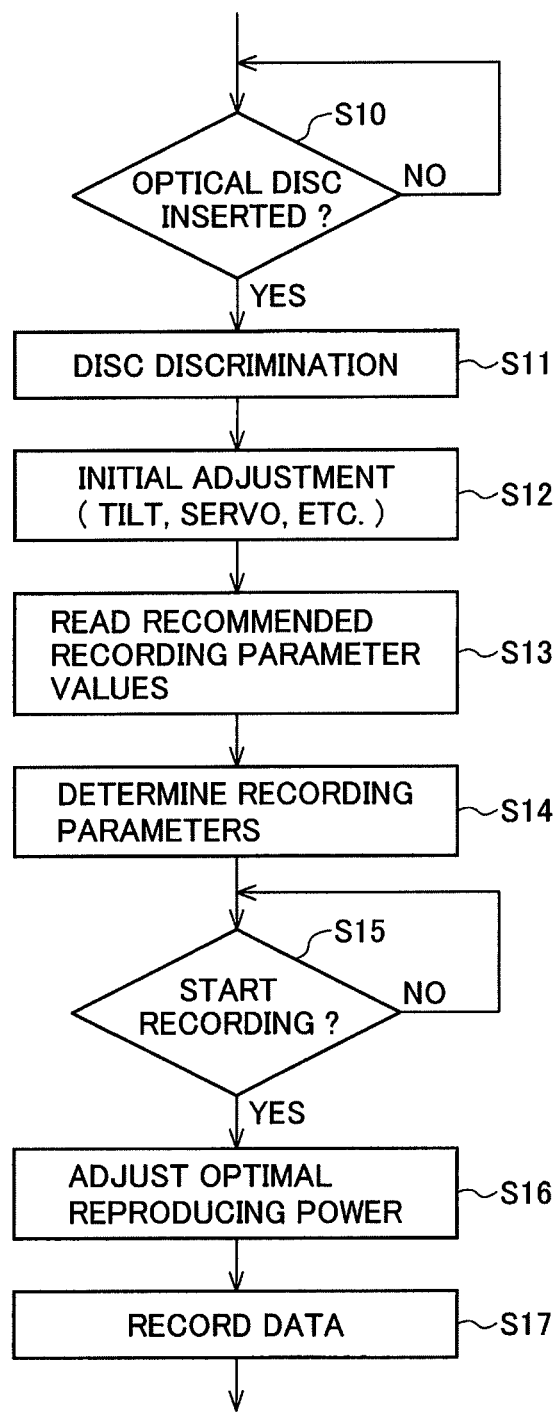
FIG. 6 is a flowchart illustrating an exemplary recording procedure used in the optical disc device in a first embodiment of this invention.
Figure 7:
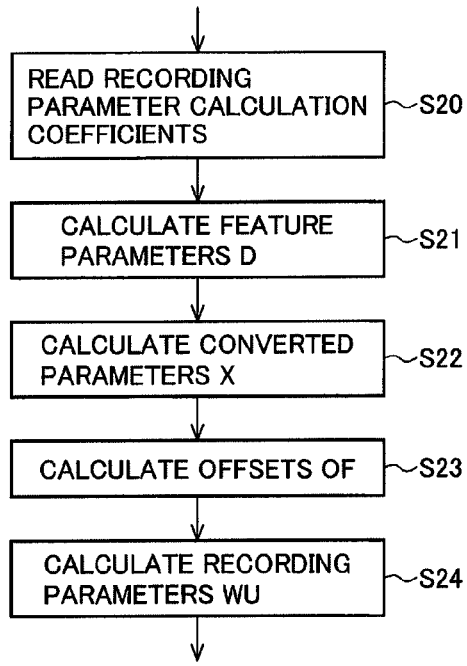
FIG. 7 is a flowchart illustrating the recording parameter decision processing procedure (step S14 in FIG. 6) used in the optical disc device in the first embodiment.

The process for determining the recording parameters in step S14 in FIG. 6 is shown in more detail in FIG. 7.

In step S20, the recording parameter calculation coefficients corresponding to the light emission rule and recording speed corresponding to the recommended recording parameter values read from the optical disc in step S13 are read from the ROM 220 in the central control unit 200. Also in this step, the recommended recording parameter values WR that have been read in step S13 and are held in the RAM 230 are read.

Principal component vectors PC and coefficients Ca, Cb are read as the recording parameter calculation coefficients. The coefficients Ca, Cb are also referred to as approximation coefficients.

The principal component vectors PC are principal component vectors obtained by principal component analysis of the differences between the recommended recording parameter values and the optimal recording parameter values, and are expressed as follows:

$$PC1 = [PC11, PC12, \ldots, PC1n] \quad (3)$$
$$PC2 = [PC21, PC22, \ldots, PC2n]$$
$$\vdots \quad \vdots \quad \vdots \quad \vdots$$
$$PCm = [PCm1, PCm2, \ldots, PCmn]$$

where m is the same as the number n of recording parameters on which the principal component analysis is carried out, smaller values of m indicating larger contribution ratios (the larger the contribution ratio, the stronger the correlation).

Principal component analysis is a statistical analysis procedure that obtains a new variable (principal component) with maximum unbiased variance from a plurality of variables. By obtaining similar principal components with maximum unbiased variance from the residues, a plurality of principal components are obtained: a first principal component having the highest contribution ratio, a second principal component having the second highest contribution ratio, a third principal component having the third highest contribution ratio, and so on (the number of principal components being the same as the number of parameters). These principal components are expressed as synthetic variables derived from the original variables and can be denoted as principal component vectors; since they are derived so as to have the maximal unbiased variance, they are derived as vector components in which there is strong correlation among the original variables.

In this embodiment, since the principal component analysis is performed on the differences between the recommended recording parameter values and the optimal recording parameter values, the principal component vectors are obtained in the order of strength of mutual correlation among the parameters.

Coefficients Ca and Cb are coefficients used in obtaining the differences between the recommended recording parameter values and the optimal recording parameter values, and are stored in the ROM 220 in the central control unit 200 in a number equal to the number of recording parameters. They are expressed by the following equations (m is the number of principal component vectors).

$$Ca = [Ca1, Ca2, \ldots, Cam]$$
$$Cb = [Cb1, Cb2, \ldots Cbm] \quad (4)$$

Principal component vectors PC and the coefficients Cai, Cbi (i=1, 2, ..., m) are stored in the central control unit 200 (in the ROM 220, for example) for each light emission rule and each recording speed.

Next, in step S21, feature parameters D are calculated from the recommended recording parameter values and the principal component vectors. The feature parameters D are calculated as follows from the recommended recording parameter values WR read from the optical disc in step S13 and read from the RAM 230 in step S20, and the principal component vectors PC read from the ROM 220 in step S20.

$$D1 = PC11 \times WR1 + PC12 \times WR2 + \ldots + PC1n \times WRn \quad (5A)$$
$$D2 = PC21 \times WR1 + PC22 \times WR2 + \ldots + PC2n \times WRn$$
$$\vdots$$
$$Dm = PCm1 \times WR1 + PCm2 \times WR2 + \ldots + PCmn \times WRn$$

Expression (5A) can be rewritten in the form below by using the principal component vectors PC1-PCm in expression (3) above.

$$\begin{bmatrix} D1 \\ D2 \\ \vdots \\ Dm \end{bmatrix} = \begin{bmatrix} PC1 \\ PC2 \\ \vdots \\ PCm \end{bmatrix} \begin{bmatrix} WR1 \\ WR2 \\ \vdots \\ WRn \end{bmatrix} \quad (5Aa)$$

Next, in step S22, converted parameters X are calculated from the feature parameters D calculated in step S21 and the coefficients Ca, Cb that were read in step S20.

$$X1 = D1 \times Ca1 + Cb1 \quad (6A)$$
$$X2 = D2 \times Ca2 + Cb2$$
$$\vdots$$
$$Xm = Dm \times Cam + Cbm$$

Next, in step S23, offsets OF between the recording parameters used in recording (WU) and the recommended recording parameter values (WR) are calculated as follows from the principal component vectors PC read in step S20 and the converted parameters X calculated in step S22.

$$OF1 = PC11 \times X1 + PC21 \times X2 + \ldots + PCm1 \times Xm \quad (7)$$
$$OF2 = PC12 \times X1 + PC22 \times X2 + \ldots + PCm2 \times Xm$$
$$\vdots$$
$$OFn = PC1n \times X1 + PC2n \times X2 + \ldots + PCmn \times Xm$$

Expression (7) can be rewritten as follows using principal component vectors PC1 to PCm.

$$\begin{bmatrix} OF1 \\ OF2 \\ \vdots \\ OFn \end{bmatrix} = \begin{bmatrix} PC1^t & PC2^t & \cdots & PCm^t \end{bmatrix} \begin{bmatrix} X1 \\ X2 \\ \vdots \\ Xm \end{bmatrix} \quad (7a)$$

$PC1^t$ to $PCm^t$ in expression (7a) are the transposed matrices (n-row, 1-column matrices) of the 1-row, n-column matrices in expression (3).

Finally, in step S24, the recording parameters WU used in recording are calculated as follows from the offsets OF calculated in step S23 and the recommended recording parameter values WR read in step S13.

$$\begin{aligned} WU1 &= WR1 + OF1 \\ WU2 &= WR2 + OF2 \\ &\vdots \\ WUn &= WRn + Ofm \end{aligned} \quad (8A)$$

Next the reason why the recording parameters used in recording are obtained in this way will be explained.

Ideally, the recording parameters WU used in recording are the optimal recording parameter values WO with which the optimal recording performance is obtained from the optical recording device 100.

The optimal recording parameter values WO are the recording parameters with which best signal quality can be obtained. Each optical disc 500 has a plurality of recording parameters that give good recording quality, and in the conditions for maintaining signal quality, the recording power and the pulse widths defined by the write strategy are complementary. That is, signal quality can be maintained by using a high recording power and narrowing the pulse widths defined by the write strategy, or using a low recording power and increasing the pulse widths defined by the write strategy. This is thought to be because this complementary adjustment maintains the total quantity of heat supplied to the optical disc 500.

With the above relation between the recording power and the pulse widths defined by the write strategy, it is possible to maintain signal quality, but the recording power margin and the margin of the pulse widths defined by the write strategy differ depending on whether the recording power is high or low.

When the recording power is high and the pulse widths defined by the write strategy are narrow, the recording power margin is widened. Conversely, when the recording power is low and the pulse widths are large, the recording power margin is narrowed. This is because when the recording power changes, there is less change in the quantity of heat if the pulse widths defined by write strategy are narrow.

The margin of the pulse widths defined by the write strategy is inversely related to the recording power margin.

Therefore, when optimizing the recording parameters, it is desirable to consider the recording power margin and the margin of the pulse widths defined by the write strategy.

In this embodiment, since the recording parameters used in recording are obtained by calculation from the recommended recording parameter values stored on the optical disc 500, a wide margin with respect to changes in the write strategy is desirable, in order to allow for error.

However, the recording power margin should also be taken into account: the margin should not be so large as to cause problems in the optical recording device.

As described above, recording parameter values optimized in a region with a large margin with respect to changes in the write strategy, specifically, a region of low recording power in which the pulse widths defined by the write strategy are large, are used as the optimal recording parameter values WO in this embodiment.

When the optimal recording parameter values WO are obtained in various regions (between the high recording power region and the low recording power region), they may be obtained as follows. The optimal recording parameter values WO are varied from the low recording power region to the high recording power region, and the recording parameters are optimized in each region to obtain a plurality of results; then the plurality of results (optimal recording parameter values) thus obtained are analyzed by a method such as principal component analysis to derive a principal component vector PC with strong correlation. In this example, the first principal component vector PC1, which has the highest contribution ratio, is used.

When the principal component vectors PC are obtained, it is desirable to obtain a plurality of optimal recording parameter values using optical discs 500 supplied by different manufacturers in different production lots (that is, a plurality of optical discs 500 with different properties), instead of using optical discs 500 supplied by one manufacturer in one production lot, and to perform the principal component analysis on all of the optimal recording parameter values thus obtained.

It is necessary, however, to use optical discs 500 of same kind with identical conditions, including write strategy light emission rules. The 'kind' being referred to here means a category into which each disc is are classified according to whether it is a write-once or rewritable BD, or write-once or rewritable DVD. Also, even optical discs 500 of the same 'type' may have write strategies with different recommended light emission rules (multi-pulse or non-multi-pulse) or different parameters depending on, for example, the recording speed, so that it is necessary to use optical discs 500 of same type to which the same parameters are applied (that is, optical discs 500 with the 'same conditions').

Next, the first principal component vector PC1 that has been obtained is used to alter the optimal recording parameter values WO. First, a parameter WOs to be used as a reference is selected from the recording parameters WO. It is desirable to select a parameter related to the pulse width defined by the write strategy and having as high as possible a vector quantity (absolute vector value) in the first principal component vector PC1 (in other words, a parameter having a large component in the direction of the first principal component vector PC1) as the reference parameter WOs.

Next, the values are shifted in the direction of a line parallel to the first principal component vector PC1, passing through the optimal recording parameter values WO already obtained. This shift is carried out so as to bring the selected parameter WOs into agreement with a desired value, such as the pulse width defined by the write strategy, for example. The desired value of parameter WOs is set so as to provide an adequate write strategy margin.

The optimal recording parameter values WO are obtained as described above.

Recommended recording parameter values WR, set by the manufacturer of the optical disc to be optimal for a specific optical recording device, are recorded on the optical disc 500. If equations describing the relation between the recommended recording parameter values WR and the optimal recording parameter values WO can be found, the recording parameters WU used in recording can be obtained from the recommended recording parameter values WR.

In this embodiment, the equations describing the relation between the recommended recording parameter values WR and the optimal recording parameter values WO use the differences between these values, together with principal component vectors indicating strong correlations (principal component vectors obtained by the principal component analysis).

First, the differences DF (=WO−WR) between the optimal recording parameter values WO and the recommended recording parameter values WR are obtained as follows for a plurality (k kinds) of optical discs 500.

$$DF1 = \{WO11 - WR11, WO12 - WR12, \ldots, WO1n - WR1n\} \quad (9)$$

$$DF2 = \{WO21 - WR21, WO22 - WR22, \ldots, WO2n - WR2n\}$$

$$\vdots \quad \vdots \quad \vdots \quad \vdots$$

$$DFk = \{WOk1 - WRk1, WOk2 - WRk2, \ldots, WOkn - WRkn\}$$

In this expression, n is the number of recording parameters and k is the number of optical discs 500 used in the calculation.

Principal component vectors are obtained by principal component analysis of the differences DF thus obtained.

$$PC1 = [PC11, PC12, \ldots, PC1n] \quad (10)$$

$$PC2 = [PC21, PC22, \ldots, PC2n]$$

$$\vdots \quad \vdots \quad \vdots \quad \vdots$$

$$PCm = [PCm1, PCm2, \ldots, PCmn]$$

Principal component vectors are obtained from a first principal component PC1, which has a high contribution ratio (strong correlation), to an m-th principal component PCm (m being equal to the number of recording parameters n).

Next, in each optical disc 500, when the values that vary depending on the optical disc 500 are denoted by the converted parameters X, the relation between the differences DF and the principal component vectors PC can be expressed by the following linear equations (the following are the equations for one kind of optical disc 500; similar calculations should be performed for each optical disc 500).

$$DF1 = PC11 \times X1 + PC21 \times X2 + \ldots + PCm1 \times Xm \quad (11)$$

$$DF2 = PC12 \times X1 + PC22 \times X2 + \ldots + PCm2 \times Xm$$

$$\vdots$$

$$DFn = PC1n \times X1 + PC2n \times X2 + \ldots + PCmn \times Xm$$

Expression (11) can be rewritten as follows using principal component vectors PC1 to PCm.

$$\begin{bmatrix} DF1 \\ DF2 \\ \vdots \\ DFn \end{bmatrix} = [PC1^t \quad PC2^t \quad \ldots \quad PCm^t] \begin{bmatrix} X1 \\ X2 \\ \vdots \\ Xm \end{bmatrix} \quad (11a)$$

$PC1^t, PC1^t, \ldots, PCm^t$ in expression (11a) are as described in relation to expression (7a).

Since the differences DF and the principal component vectors PC are known, the values of the converted parameters X can be obtained by solving this linear equation.

Next the converted parameters X, which have values that vary depending on the optical disc 500, will be derived by relating them to the recommended recording parameter values WR, which can be obtained from the optical disc 500. This enables the differences DF to be obtained from the converted parameters X and the principal component vectors PC, and the recording parameters WU to be used in recording to be derived by adding the differences DF to the recommended recording parameter values WR.

The principal component vectors PC, which have already been obtained, are used to relate the converted parameters X to the recommended recording parameter values WR.

First, feature parameters D representing the features of each of the optical discs 500 are calculated by performing a sum-of-products operation on the recommended recording parameter values WR and each principal component of the principal component vectors PC (the first to m-th principal components) as follows (the following equations are for one kind of optical disc 500; a similar calculation should be performed for each optical disc 500).

$$D1 = PC11 \times WR1 + PC12 \times WR2 + \ldots + PC1n \times WRn \quad (5B)$$

$$D2 = PC21 \times WR1 + PC22 \times WR2 + \ldots + PC2n \times WRn$$

$$\vdots$$

$$Dm = PCm1 \times WR1 + PCm2 \times WR2 + \ldots + PCmn \times WRn$$

Expression (5B), like expression (5A), can be expressed using the principal component vectors PC1 to PCm.

The relation between the feature parameters D and the converted parameters X found for a plurality (k kinds) of optical discs 500 is a proportional relationship that can be approximated by the following first-degree equations using coefficients Ca and Cb. In these equations, x is an index value indicating the optical disc 500} (x=1 to k).

$$X1(x) = Ca1 \times D1(x) + Cb1 \quad (12)$$

$$X2(x) = Ca2 \times D2(x) + Cb2$$

$$\vdots$$

$$Xm(x) = Cam \times Dm(x) + Cbm$$

Figure 8:
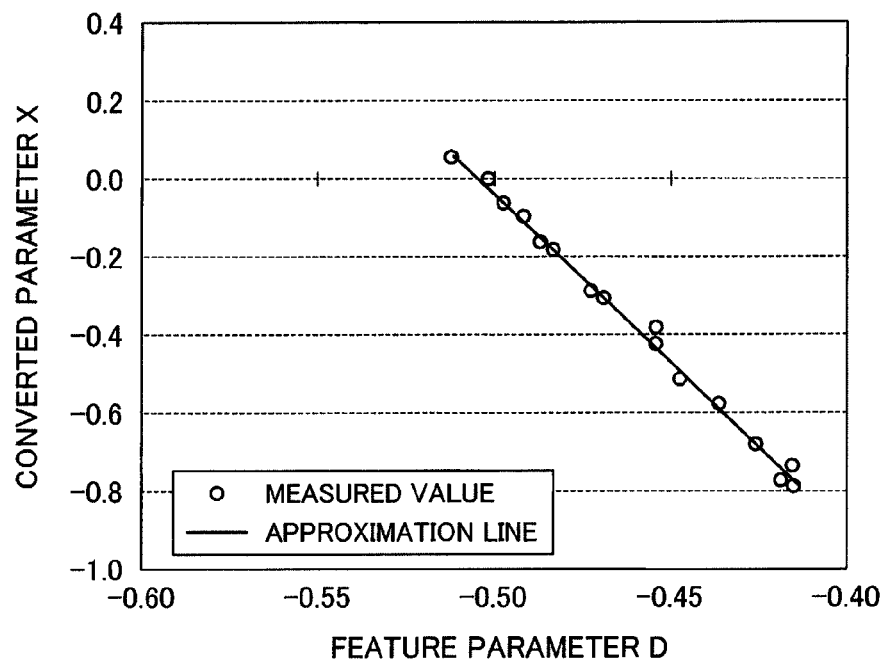
FIG. 8 illustrates the relation (measurement results) between a feature parameter D and converted parameter X in the optical recording device in the first embodiment when the optical disc 500 is a DVD-R.
Figures 9, 10:
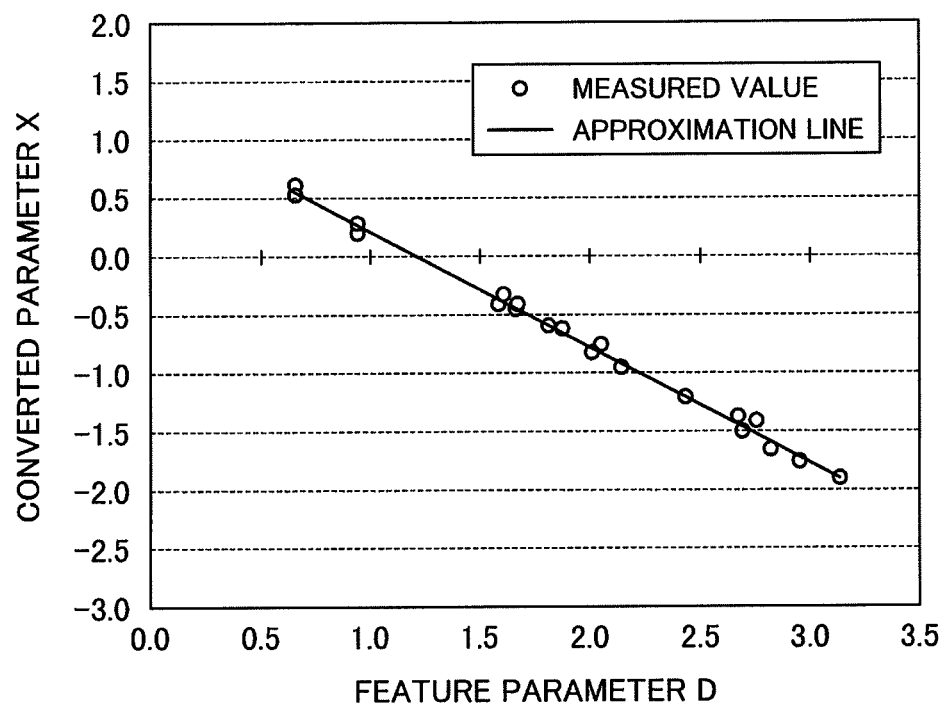
FIG. 9 illustrates the relation (measurement results) between a feature parameter D and converted parameter X in the optical recording device in the first embodiment when the optical disc 500 is a BD-R.
FIG. 10 shows a conventional recording parameter list table.

Relations between actually derived features D1 (x) and converted parameters X1 (x) are shown in FIGS. 8 and 9. FIG. 8 gives results for a DVD-R, while FIG. 9 gives results for a BD-R, showing that both can be approximated linearly. Like the relation between feature parameters D1 and converted parameters X1, the relations between the feature parameters D and converted parameters X of the second and subsequent principal components can be approximated linearly.

Thus once the already-investigated principal component vectors PC, the coefficients Ca, Cb indicating the relationship between the feature parameters D and the converted parameters X, and recommended recording parameter values WR are known, recording parameters WU to be used in recording, equivalent to the optimal recording parameter values WO, can be obtained.

To find the principal component vectors and the coefficients Ca, Cb, it is necessary to investigate the optimal recording parameter values in advance for a plurality of optical discs 500, but it is not necessary to test all optical discs 500; it is possible to select optical discs for which the recommended recording parameter values recorded on the optical disc 500 differ particularly greatly.

Also, since the relation between the recommended recording parameter values and the optimal recording parameter values is obtained by using principal component vectors with strong correlation obtained by principal component analysis, the recording parameters WU to be used in recording on an optical disc 500 that has not been investigated can be obtained by using the principal component vectors and coefficients Ca, Cb corresponding to the light emission rule and the recording speed corresponding to the recommended recording parameter values, provided the recommended recording parameter values have been recorded.

Thus in the first embodiment, from the optimal recording parameter values and the recommended recording parameter values recorded on the optical disc 500, principal component vectors obtained as a result of principal component analysis of the difference between the optimal recording parameter values and the recommended recording parameter values and coefficients Ca, Cb used in equations describing the relation between feature parameters D and converted parameters X are precalculated, so that it is possible to calculate the recording parameters to be used in recording, by use of the preset principal component vectors and coefficients Ca, Cb, from the recommended recording parameter values stored on the optical disc 500 used in recording. Accordingly, the optimal recording parameters can be obtained even when the optimal recording parameters corresponding to the optical disc 500 are unknown.

Since the recording parameters used in recording are calculated from the recommended recording parameter values recorded on the optical disc 500 and the principal component vectors and coefficients Ca, Cb prestored in the central control unit 200, no extra adjustment time is required before recording begins; this should be compared in particular with the case in which the write strategy recording parameters are adjusted by test writing. Also, it is not necessary to store a huge quantity of optimal recording parameter values in the central control unit 200; the optical recording device 100 only needs to store principal component vectors and coefficients Ca, Cb corresponding to the kinds of optical discs 500 (BD, DVD, CD, etc.), the light emission waveform rules, and the recording speeds, which saves memory space.

As described above, for each optical recording medium there are a plurality of optimal recording parameter values, but when principal component vectors, which can be obtained by investigating the difference between the recommended recording parameter values of the optical recording medium and the optimal recording parameter values for particular recording methods used in recording in advance and performing a principal component analysis of the differences, are used as vector information, recording parameters optimized to attain favorable recording performance at low recording power, within an acceptable range of variation of the recording power, may be used as the optimal recording parameter values used in determining the vector information, and they may be optimized so that the parameters for the recording power or the pulse widths defined by the write strategy have mutually close values among a plurality of optical recording media.

Second Embodiment

Next, the procedure used in the optical recording method in the second embodiment will be described.

An optical recording device 100 generally holds a list of recording parameters corresponding to the IDs of optical discs 500 in its central control unit 200 (e.g., in its ROM 220). The list of recording parameters (table) holds write strategy parameter settings together with asymmetry values or modulation indexes that will become target values for power adjustment. FIG. 10 shows an exemplary recording parameter list table. The ID of the optical disc 500 shown here is preset by the manufacturer of the optical disc 500 and recorded on the optical disc 500 (in lead-in area, for example) as unique information.

In the second embodiment, instead of holding IDs of optical discs 500 and corresponding recording parameters, this recording parameter list holds a list of feature parameters D and corresponding recording parameter offsets.

Figures 11, 12:
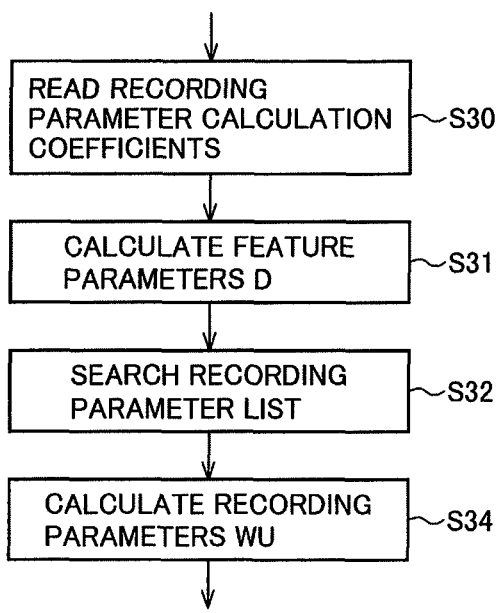
FIG. 11 shows a list table including feature parameters D and the corresponding recording parameter offsets in a second embodiment of this invention.
FIG. 12 is a flowchart illustrating the recording parameter decision processing procedure (step S14 in FIG. 6) used in the optical disc device in the second embodiment of this invention.

FIG. 11 shows an exemplary list of recording parameter offsets WP corresponding to feature parameters D.

The feature parameters D are obtained in substantially same way as in the first embodiment. The recording parameter offsets WP are equivalent to the differences DF (=WO−WR) between the optimal recording parameter values WO and the recommended recording parameter values WR in the first embodiment, and are listed for each feature parameter D.

Although feature parameters D (Di1 to Din) corresponding to all principal components obtained by principal component analysis (equal in number to the number of recording parameters on which the principal component analysis was performed) are used as the feature parameters D in FIG. 11, it is also possible to use only the feature parameters D corresponding to principal components with high contribution ratios.

The procedure followed in the optical recording method according to the second embodiment is substantially the same as that described with reference to FIG. 6 in connection with the first embodiment. However, the specific method of determining the recording parameters at step S14 is different. More specifically, the procedure shown in FIG. 12 is used instead of the procedure described with reference to FIG. 7.

In step S30 in FIG. 12, as in step S20 in FIG. 7, principal component vectors PC are read from the ROM 220 of the central control unit 200 as recording parameter calculation coefficients corresponding to the light emission rule and the recording speed corresponding to the recommended recording parameter values read from the optical disc in step S13. The recommended recording parameter values WR that were read in step S13 and are held in the RAM 230 are also read.

Next, in step S31, feature parameters D are calculated from the recommended recording parameter values WR read from the optical disc in step S13 and read from the RAM 230 in step S30, and the principal component vectors PC.

The principal component vectors are prestored in the ROM 220 of the central control unit 200; principal component vectors adapted to the kind of optical disc 500 used (BD, DVD, CD, or the like) and to the light emission rule and recording speed conditions corresponding to the recommended recording parameter values that were read are used for the calculation of feature parameters D.

The feature parameters D are calculated from the recommended recording parameter values WR and the principal component vectors PC according to the following equations. In the following equations, n represents the number of recording parameters, m is identical to the number of recording parameters n included in the principal component analysis, and a smaller m indicates a higher contribution ratio (a higher contribution ratio representing a stronger correlation).

$$D1 = PC11 \times WR1 + PC12 \times WR2 + \ldots + PC1n \times WRn \quad (5C)$$
$$D2 = PC21 \times WR1 + PC22 \times WR2 + \ldots + PC2n \times WRn$$
$$\vdots$$
$$Dm = PCm1 \times WR1 + PCm2 \times WR2 + \ldots + PCmn \times WRn$$

Like equations (5A), equations (5C) can be expressed in terms of principal components vectors PC1 to PCm.

Next, in step S32, the feature parameters D obtained in step S31 are compared with the feature parameters D in the list in FIG. 11 to find recording parameter offsets WPi1 to WPin with the feature parameters identical to the feature parameters obtained in step S31.

Next, in step S34, the recording parameter offsets WPi1 to WPin obtained in step S32 are added to the recommended recording parameter values WR read from the optical disc 500 in step S13 to calculate the recording parameters WU used in recording.

This computation is expressed by the following equations.

$$WU1 = WR1 + WPi1 \quad (13)$$
$$WU2 = WR2 + WPi2$$
$$\vdots$$
$$WUn = WRn + Wpin$$

Although a list of recording parameter offsets corresponding to feature parameters D is held in the second embodiment, the list may have other values. For example, converted parameters X corresponding to the feature parameters D may be listed instead of recording parameter offsets. In that case, the calculation of recording parameters in step S33 should be altered according to the data stored in the list.

When the recording parameter list does not include the same value as the feature parameter D calculated in step S31, calculations similar to those in the first embodiment can be carried out.

Furthermore, as the recording parameter list is stored in the central control unit 200 (for example in the ROM 220), a rewritable memory such as an EEPROM may be used as the ROM 220, and if the feature parameter D is not included in the list, it may be newly added to the list.

As described above, in the second embodiment, a list of differences between the optimal recording parameter values and the recommended recording parameter values is stored in the optical recording device for each feature parameter D calculated from the recommended recording parameter values, the differences corresponding to the feature parameter D calculated from the recommended recording parameter values of the optical disc 500 are selected, and the differences are added to the recommended recording parameter values, to obtain the recording parameters used for recording, enabling memory capacity to be used more efficiently, without redundant information giving the same recording parameters, as compared with the conventional storage of a list for each ID of the optical discs 500. Also, in comparison with the first embodiment, the calculations in equations (6A) and (7) can be omitted.

Third Embodiment

Figure 13:
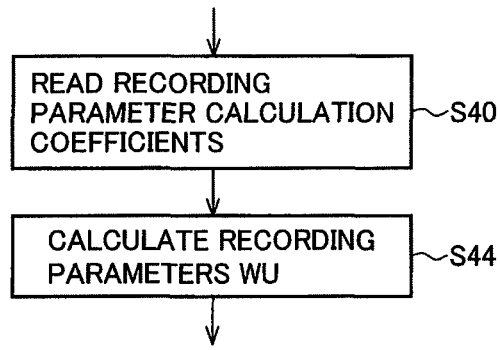
FIG. 13 is a flowchart illustrating the recording parameter decision processing procedure (step S14 in FIG. 6) used in the optical disc device in a third embodiment of this invention.

Next, the procedure used in the optical recording method in the third embodiment will be described. The procedure followed in the optical recording method in the third embodiment is substantially the same as that described with reference to FIG. 6 in connection with the first embodiment. However, the specific method of determining the recording parameters in step S14 is different. More specifically, the procedure shown in FIG. 13 is used instead of the procedure described with reference to FIG. 7.

In step S40, as in step S20 in FIG. 7, the recommended recording parameter values WR read from the optical disc in step S13 and preset recording parameter calculation coefficients Da, Db stored in the ROM 220 of the ROM 220 are read. The recommended recording parameter values WR that were read in step S13 and are held in the RAM 230 are also read.

These coefficients Da, Db, also referred to as approximation coefficients, are coefficients used to obtain the differences between the recommended recording parameter values and the optimal recording parameter values, and are stored in the ROM 220 of the central control unit 200 in a number equal to the number of recording parameters. The coefficients Da, Db are expressed as follows (n is the number of the recording parameters).

Da={Da1, Da2, . . . , Dan}

Db={Db1, Db2, . . . , Dbn} (14)

Coefficients Dai and Dbi (i=1, 2, . . . , n) are stored in the ROM 220 in the central control unit 200 for each light emission rule and each recording speed.

Next, in step S44, the recording parameters WU are calculated as follows using the recommended recording parameter values WR that were read from the optical disc in step S13 and read from the RAM 230 in step S40, and the recording parameter calculation coefficients Dai, Dbi that were read from the ROM 220 in step S40.

$$WU1 = WR1 \times (Da1 + 1) + Db1 \quad (15)$$
$$WU2 = WR2 \times (Da2 + 1) + Db2$$
$$\vdots$$
$$WUn = WRn \times (Dan + 1) + Dbn$$

Next the reason why the recording parameters used in recording are obtained in this way will be explained.

Ideally, the recording parameters WU used in recording are the optimal recording parameter values WO with which the optimal recording performance is obtained from the optical recording device 100.

In the third embodiment, the relation between the recommended recording parameter values WR and the differences DF between the optimal recording parameter values WO and the recommended recording parameter values WR can be approximated linearly, and the coefficients Da, Db are obtained by approximation of the relation between the recommended recording parameter values WR and the differences DF between the optimal recording parameter values WO that ought to be used in recording and the recommended recording parameter values WR, over a plurality of optical recording media so that, for example, relations such as the following hold true.

$$DF1 = WO1 - WR1 = Da1 \times WR1 + Db1 \quad (16)$$
$$DF2 = WO2 - WR2 = Da2 \times WR2 + Db2$$
$$\vdots$$
$$DFn = WOn - WRn = Dan \times WRn + Dbn$$

These equations can be transformed to express the optimal recording parameter values WO as follow.

$$WO1 = WR1 \times (Da1 + 1) + Db1 \quad (17)$$
$$WO2 = WR2 \times (Da2 + 1) + Db2$$
$$\vdots$$
$$WOn = WRn \times (Dan + 1) + Dbn$$

Since the recording parameters WU used in recording are ideally equal to the optimal recording parameter values WO, the recording parameters WU used for recording can be obtained by employing the optimal recording parameter values WO in the above equations as the recording parameters WU. That is, equations (15) are obtained by substituting WU for WO in equations (17).

The optimal recording parameter values WO must be obtained as in the first embodiment.

When compared to the first embodiment, the third embodiment requires less calculation, but the error in the resulting recording parameters WU (deviation from the optimal recording parameter value WO) is greater.

As described above, in the third embodiment, coefficients Da, Db are obtained in advance from the optimal recording parameter values and the recommended recording parameter values stored on the optical disc 500 by use of a linear approximation of the relation between the differences between the optimal recording parameter values and the recommended values on the one hand and the recommended recording parameter values on the other hand, and the recording parameters to be used in recording can be calculated, by use of the preset coefficients Da, Db, and the recommended recording parameter values recorded on the optical disc 500 to be used for recording, so that the optimal recording parameters can be obtained even when the optimal recording parameters corresponding to the optical disc 500 are unknown.

In addition, since the recording parameters used in recording are calculated from the recommended recording parameter values recorded on the optical disc 500 and coefficients Da, Db prestored in the central control unit 200, no extra adjustment time is required before recording begins; this should be compared in particular with the case in which the write strategy recording parameters are adjusted by test writing. Also, it is not necessary to store a huge quantity of optimal recording parameter values in the central control unit 200; the optical recording device 100 only needs to store coefficients Da and Db corresponding the kinds of optical discs 500 (BD, DVD, CD, etc.), the light emission waveform rules, and the recording speeds, which saves memory space.

Fourth Embodiment

Next, the procedure used in the optical recording method in the fourth embodiment will be described.

Figure 14:
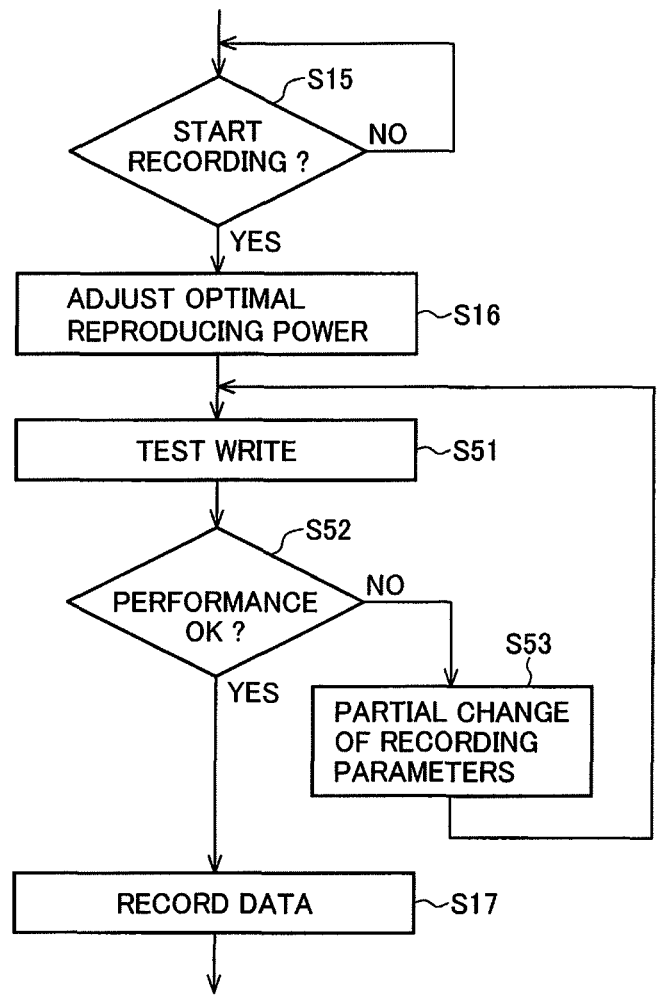
FIG. 14 a flowchart illustrating the recording procedure used in the optical disc device in a fourth embodiment of this invention.

FIG. 14 illustrates the procedure used in the optical recording method in the fourth embodiment. The processing up to step S16 and the processing from step S17 onward are omitted because they are as described with reference to FIGS. 6 and 12.

After the recording power is adjusted in step S16, test writing is performed in step S51, using the recording power as adjusted in step S16 and the write strategy with the recording parameters selected for use in recording in step S14; the recorded signals are reproduced; and the signal quality (recording quality) is measured. This test writing is performed by use of, for example, a test recording area provided on the optical disc 500.

In step S52, the measured signal quality (recording quality) is compared with a predefined reference value to decide whether there is no problem. This decision is also referred to as a recording performance decision.

When performance is determined to be OK in step S52 (Yes: the performance is superior to the reference value), data recording starts in step S17.

When performance is determined to be NG in step S52 (No: the performance is inferior to the reference value), the process in step S53 is performed.

In step S53, some of the parameters among the recording parameters used for test writing in step S51 are altered, test writing is performed again in step S51 using the altered recording parameters, and the subsequent processing is performed in the same way.

Parameters that yielded poor approximation accuracy (degree of correlation) when the coefficients Ca, Cb or Da, Db were obtained, for example, are given priority for selection as the recording parameters altered in step S53. The approximation accuracy is stored in the central control unit 200 together with coefficients Ca, Cb or Da, Db. In this way, recording parameters that deviate greatly from the optimal recording parameter values that ought to be used in recording can be corrected with priority, among the recording parameters used in recording.

Alternatively, the recording parameters with large effects on recording performance may be investigated in advance, and the parameters with large effects may be corrected as the recording parameters altered in step S53.

In FIG. 14, the processing in steps S53 and S51 is repeated until the performance becomes superior to the reference value in step S52, but the number of times test writing is executed may be limited and modification of the recording parameters may be stopped when the limit is reached. The recording parameters that yielded the best performance thus far may then be used to record data in step S17 and thereafter. When the performance is so bad that reproduction of the recorded data would be impossible, however, the procedure can be stopped without carrying out the processes in step S17 and thereafter.

In FIG. 14, test writing is performed in step S51 after the alteration of recording parameters in step S53; alternatively, the test writing in step S51 may be performed after the power adjustment in step S16.

As described above, in the fourth embodiment, after the preset coefficients and relations have been used to calculate the recording parameters to be used in recording from the recommended recording parameter values read from the optical disc 500, the recording quality is checked by test writing, and when the recording quality is poor, the calculated recording parameters are corrected, so that even when there is error in the results of the recording parameter calculation, the results can be altered to obtain appropriate recording parameters.

Furthermore, since the recording parameter corrections are starting from the recording parameters obtained by calculation, the corrections start from parameters close to the optimal recording parameter values, so that the recording parameters can be appropriately modified with less test writing.

Also, since information about approximation accuracy (strength of correlation) when the coefficients Ca, Cb or Da, Db were obtained is stored, and the recording parameters with poorer approximation accuracy (weak correlation) are corrected with priority, recording parameters with large deviations from the optimal recording parameter values are likely to be corrected first, which makes it possible to correct the recording parameters appropriately with fewer test writing iterations.

Furthermore, since the recording parameters are corrected from values very close to the optimal recording parameter values and the corrections can thus be made with less test writing, the waiting period before recording begins is reduced and the usage of test recording space is reduced.

Since the recording and reproducing performance obtained with the calculated recording parameters is checked and the recording parameters are corrected, favorable recording and reproducing performance can be achieved despite variations between optical recording devices or variations between optical discs.

In the embodiments described, the principal component vectors are obtained by principal component analysis, but other multivariate statistical analysis methods, such as, for example, independent component analysis method, may be used.

The optical recording device 100 in the embodiments described records EFM+ (8-16) modulated recording data on the optical disc 500 (e.g., the optical disc 500 is a DVD), but the invention is not limited to the particular modulation scheme and is also applicable when the optical recording device 100 records 1-7 modulated recording data on the optical disc 500 (e.g., the optical disc 500 is a Blu-ray Disc), provided at least that the optical disc 500 has recommended recording parameter values recorded thereon, and that principal component vectors and coefficients Ca, Cb corresponding to the light emission rule and the recording speed of the disc can be obtained in advance.

In the embodiments described, all of the principal component vectors obtained by the principal component analysis are used, but the principal components vectors used may be selected according to their contribution ratios, because principal component vectors with low contribution ratios have almost no effect on the recording parameters.

In the embodiments described, the principal component analysis is performed using all the write strategy and OPC settings as the recording parameters, but parameters the settings of which are not changed for certain optical discs 500 may be excluded from the principal component analysis.

Alternatively, the principal component analysis may be performed separately on the write strategy and OPC settings. In this case, other calculations need to be performed separately as well, by performing the calculations for each recording parameter used in the principal component analysis.

In the embodiments described, the feature parameters D are obtained by performing a sum-of-products operation on the recommended recording parameter values WR and each of the principal components (the first principal component to the m-th principal component) of the principal component vectors PC, but the mean value may be used instead of the total sum. It is also possible to use the Euclidean distance, Mahalanobis distance, or the like from the products of the recommended recording parameter values WR and the principal components (the first principal component to the m-th principal component), provided the relations between the feature parameters D and the converted parameters X can be approximated by first-degree equations. This linear approximation capability is not strictly necessary however; if rules and conversion formulas that permit unique conversion from feature parameters D to converted parameters X can be derived, the derived rules and conversion formulas may be used.

In the embodiments described, the principal component vectors and coefficients Ca, Cb are obtained in advance, but this need be done only once for each type of optical recording device; once the coefficients have been obtained, they may be used for a large plurality of optical recording devices of same type. Once the coefficients are obtained for a certain type of optical recording device, that is, other devices of the same type may be shipped with the same coefficients set therein.

REFERENCE CHARACTERS 100 optical recording device, 110 preamplifier, 120 reproduced signal processing section, 130 recording quality measurement unit, 140 data decoder, 150 reproduction characteristic measurement unit, 160 data encoder, 170 write strategy control unit, 180 servo controller, 181 spindle motor, 182 sled motor, 190 buffer memory, 200 central control unit, 210 CPU, 220 ROM, 230 RAM, 300 optical head, 310 semiconductor laser, 320 laser driving circuit, 330 collimating lens, 340 beam splitter, 350 objective lens, 360 detecting lens, 370 light receiving element, 400 host controller, 500 optical disc.

What is claimed is:
1. An optical recording method for recording information on an optical recording medium by directing laser light onto the optical recording medium according to recording parameters responsive to recorded data length, the recording parameters including a plurality of parameters, the optical recording method comprising:
  a recommended recording condition reading step for reading recommended recording parameter values from the optical recording medium, on which the recommended recording parameter values have been recorded;
  a recording parameter decision step for using the recommended recording parameter values read in the recommended recording condition reading step and vector information and approximation coefficients obtained in advance to obtain the recording parameters to be used in recording; and
  a writing step for using the recording parameters thus obtained to write on the optical recording medium by the recording method; wherein
  the vector information includes a principal component vector obtained by finding parameter difference values between optimal recording parameter values and the recommended parameter values of the optical recording media in advance, and performing a principal component analysis on the difference values; and
  the approximation coefficients are coefficients for conversion obtained according to rules and conversion formulas that permit unique conversion from feature information indicating feature parameters of each optical recording medium calculated from the recommended recording parameter values and the vector information to converted information indicating a relation between the vector information and the parameter difference values, the converted information is a solution to linear equations having the vector information as coefficients and the parameter difference values as constants;

the feature information is feature information indicating feature parameters of each optical recording medium found by using the vector information to weight the parameters of the recommended recording parameter values.

2. The optical recording method of claim 1, wherein the optimal recording parameter values used for determining the vector information are values optimized to attain favorable recording performance at low recording power within an acceptable range of variation of the recording power.

3. The optical recording method of claim 1, wherein the optimal recording parameter values used for determining the vector information are values optimized so that parameters for the recording power or for pulse widths defined by a write strategy have mutually close values over a plurality of optical recording media.

4. The optical recording method of claim 1, wherein the approximation coefficients are slopes and offsets and are obtained by:
  deriving the relation between the converted information and the feature information over a plurality of optical recording media; and
  linearly approximating the relation between the feature information and the converted information.

5. The optical recording method of claim 1, further comprising:
  a recording performance decision step for checking recording performance by performing test writing using the recording parameters determined in the recording parameter decision step, and deciding whether the recording performance is superior or inferior to a predetermined reference recording performance; and
  a recording parameter correction step for correcting the recording parameters if the recording performance is decided to be inferior to the reference recording performance in the recording performance decision step; wherein,
  the writing onto the optical recording medium in the writing step is performed using the recording parameters used for the test writing if the recording performance is determined to be superior to the reference recording performance in the recording performance decision step;
  an approximation accuracy of each of the recording parameters is obtained when the approximation coefficients are obtained; and
  recording parameters with poor approximation accuracy are corrected with priority in the recording parameter correction step.

6. An optical recording device for recording information on an optical recording medium by directing laser light onto the optical recording medium according to recording parameters responsive to recorded data length, the recording parameters including a plurality of parameters, the optical recording device comprising:
  a recommended recording condition reading means for reading recommended recording parameter values from the optical recording medium, on which the recommended recording parameter values have been recorded;
  a recording parameter decision means for using the recommended recording parameter values read by the recommended recording parameter reading means and vector information and approximation coefficients obtained in advance to obtain the recording parameters to be used in recording; and
  a writing means for using the recording parameters thus obtained to write on the optical recording medium by use of the recording device; wherein
  the vector information includes a principal component vector obtained by finding parameter difference values between optimal recording parameter values and the recommended parameter values of the optical recording media in advance, and performing a principal component analysis on the difference values; and
  the approximation coefficients are coefficients for conversion obtained according to rules and conversion formulas that permit unique conversion from feature information indicating feature parameters of each optical recording medium calculated from the recommended recording parameter values and the vector information to converted information indicating a relation between the vector information and the parameter difference values,
  the converted information is a solution to linear equations having the vector information as coefficients and the parameter difference values as constants;
  the feature information is feature information indicating feature parameters of each optical recording medium found by using the vector information to weight the parameters of the recommended recording parameter values.

7. The optical recording device of claim 6, wherein the optimal recording parameter values used for determining the vector information are values optimized to attain favorable recording performance at low recording power within an acceptable range of variation of the recording power.

8. The optical recording device of claim 6, wherein the optimal recording parameter values used for determining the vector information are values optimized so that parameters for the recording power or for pulse widths defined by a write strategy have mutually close values over a plurality of optical recording media.

9. The optical recording device of claim 6, wherein the approximation coefficients are slopes and offsets and are obtained by:
  deriving the relation between the converted information and the feature information over a plurality of optical recording media; and
  linearly approximating the relation between the feature information and the converted information.

10. The optical recording device of claim 6, further comprising:
  a recording performance decision means for checking recording performance by performing test writing using the recording parameters determined by the recording parameter decision means, and deciding whether the recording performance is superior or inferior to a predetermined reference recording performance; and
  a recording parameter correction means for correcting the recording parameters if the recording performance is decided by the recording performance decision means to be inferior to the reference recording performance; wherein,
  the writing onto the optical recording medium by the writing means is performed using the recording parameters used for the test writing if the recording performance is determined by the recording performance decision means to be superior to the reference recording performance;

an approximation accuracy of each of the recording parameters is determined when the approximation coefficients are obtained; and recording parameters with poor approximation accuracy are corrected with priority by the recording parameter correction means.

11. An optical recording method for recording information on an optical recording medium by directing laser light onto the optical recording medium according to recording parameters responsive to recorded data length, the recording parameters including a plurality of parameters, the optical recording method comprising:

a recommended recording condition reading step for reading recommended recording parameter values from the optical recording medium, on which the recommended recording parameter values have been recorded;

a recording parameter decision step for using the recommended recording parameter values read in the recommended recording condition reading step and vector information and approximation coefficients obtained in advance to obtain the recording parameters to be used in recording; and a writing step for using the recording parameters thus obtained to write on the optical recording medium by the recording method; wherein the vector information includes a vector obtained by finding parameter difference values between optimal recording parameter values and the recommended parameter values of the optical recording media in advance, and performing a independent component analysis on the difference values; and the approximation coefficients are coefficients for conversion obtained according to rules and conversion formulas that permit unique conversion from feature information indicating feature parameters of each optical recording medium calculated from the recommended recording parameter values and the vector information to converted information indicating a relation between the vector information and the parameter difference values, the converted information is a solution to linear equations having the vector information as coefficients and the parameter difference values as constants;

the feature information is feature information indicating feature parameters of each optical recording medium found by using the vector information to weight the parameters of the recommended recording parameter values.

12. An optical recording device for recording information on an optical recording medium by directing laser light onto the optical recording medium according to recording parameters responsive to recorded data length, the recording parameters including a plurality of parameters, the optical recording device comprising:

a recommended recording condition reading means for reading recommended recording parameter values from the optical recording medium, on which the recommended recording parameter values have been recorded;

a recording parameter decision means for using the recommended recording parameter values read by the recommended recording parameter reading means and vector information and approximation coefficients obtained in advance to obtain the recording parameters to be used in recording; and a writing means for using the recording parameters thus obtained to write on the optical recording medium by use of the recording device; wherein the vector information includes a vector obtained by finding parameter difference values between optimal recording parameter values and the recommended parameter values of the optical recording media in advance, and performing a independent vector analysis on the difference values; and the approximation coefficients are coefficients for conversion obtained according to rules and conversion formulas that permit unique conversion from feature information indicating feature parameters of each optical recording medium calculated from the recommended recording parameter values and the vector information to converted information indicating a relation between the vector information and the parameter difference values, the converted information is a solution to linear equations having the vector information as coefficients and the parameter difference values as constants;

the feature information is feature information indicating feature parameters of each optical recording medium found by using the vector information to weight the parameters of the recommended recording parameter values.

* * * * *